United States Patent [19]

Stegelmeier et al.

[11] Patent Number: 4,760,903
[45] Date of Patent: Aug. 2, 1988

[54] METHOD AND APPARATUS FOR EXTENDING THE LIFE OF A WRAP SPRING CLUTCH

[75] Inventors: Ulrich H. E. Stegelmeier; Keith A. Ganton, both of Waterloo, Canada

[73] Assignee: NCR Corporation, Dayton, Ohio

[21] Appl. No.: 53,885

[22] Filed: May 18, 1987

[51] Int. Cl.$^4$ .................. F16D 13/02; F16D 13/08
[52] U.S. Cl. .................. 192/26; 192/12 BA; 192/17 D; 192/33 C; 192/81 C
[58] Field of Search .................. 192/26, 33 C, 81 C, 192/8 C, 17 D, 12 BA, 41 S, 56 C

[56] References Cited

U.S. PATENT DOCUMENTS

| | | | |
|---|---|---|---|
| 2,577,181 | 12/1951 | Christensen | 192/81 C |
| 3,434,576 | 3/1969 | Blodgett | 192/26 X |
| 3,726,372 | 4/1973 | Baer et al. | 192/26 |
| 3,920,106 | 11/1975 | Nisenson | 192/26 X |
| 4,437,552 | 3/1984 | Toyama | 192/26 |

OTHER PUBLICATIONS

Warner Wrap Spring Clutches & Brakes, Warner Electric Brake & Clutch Company, 1982, pp. 20 & 21.

*Primary Examiner*—Rodney H. Bonck
*Attorney, Agent, or Firm*—Wilbert Hawk, Jr.; Albert L. Sessler, Jr.; Elmer Wargo

[57] ABSTRACT

A method and apparatus for extending the life of a control or drive spring in a wrap spring clutch. The tang of the control spring fits into a control slot of a control collar which rotates when the clutch is actuated. When the clutch is actuated, the control spring "wraps down" on both a rotating input member and the output shaft of the clutch to transfer the rotary motion of the input member to the output shaft. An elastomeric sleeve which is dimensioned to provide an interference fit between the tang and control slot of the control member is positioned on the tang and inserted in the control slot to remove any looseness or play between the tang and the control slot and thereby extend the life of the control spring and clutch.

19 Claims, 3 Drawing Sheets

PRIOR ART

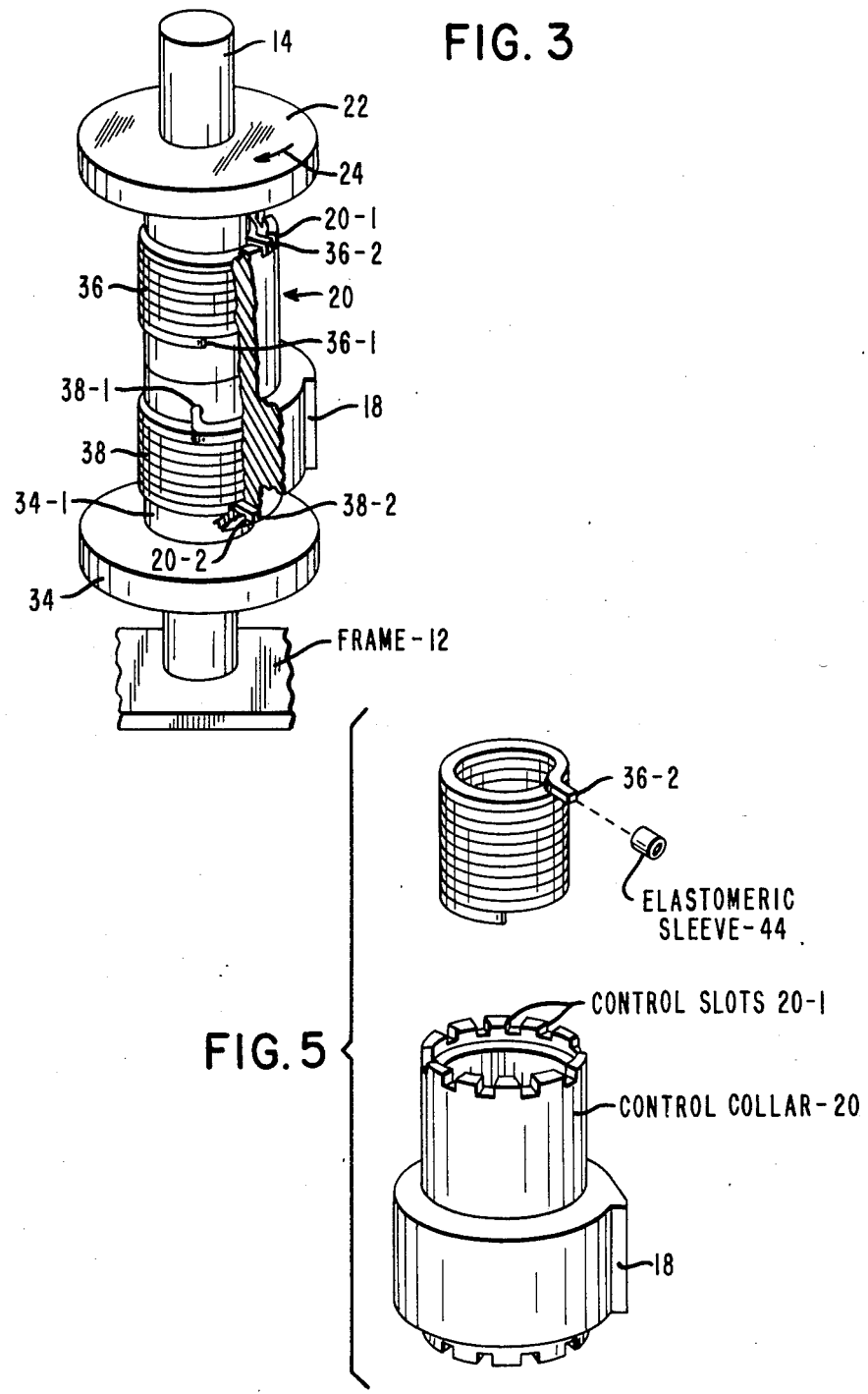

4,760,903

METHOD AND APPARATUS FOR EXTENDING THE LIFE OF A WRAP SPRING CLUTCH

BACKGROUND OF THE INVENTION

This invention relates to a method and apparatus for extending the life of a control or drive spring in a wrap spring clutch.

Drive springs are used in overrunning clutches, on-off clutches, and single revolution clutches, for example. In general, the control or drive spring, which is also called a "wrap spring", is used to provide the driving coupling between an input hub and an output hub or shaft of the associated clutch. When the clutch is actuated, the drive spring is tightened around the input and output hubs forming the driving coupling or connection therebetween.

The single revolution clutches mentioned, or clutches which provide two or more stops per revolution of the input member, are provided generally with a drive spring and a brake spring. The drive and brake springs each have a tang which is bent outwardly in a radial direction. The inner ends of the drive and brake springs are connected to the output member of the clutch, and the tangs of the drive and brake springs are mounted in separate control slots in a common control collar which surrounds the output member and the two springs. The drive and brake springs are wound in opposite directions so that when the clutch is actuated by releasing the control collar, the control spring "tightens down" on a rotating input sleeve and the output member while the brake spring "opens up" or loosens, permitting the rotary motion of the input sleeve to be transferred to the output member.

When the clutches mentioned in the previous paragraph were run at the upper end of the associated input speed range, they failed, persistently, at about one million cycles of operation. The failure was due, generally, to the tang of the drive spring breaking. Failure of the clutch at about one million cycles of operation was too short a life for a particular application in which the clutch was used.

Numerous attempts by clutch vendors and others to change the wire size of the drive spring, the wire material, and the wire geometry, for example, failed to provide a solution which prolonged or extended the life of the drive spring and the associated clutch.

SUMMARY OF THE INVENTION

In contrast with the prior art attempts to prolong the life of the drive spring and the associated wrap spring clutch, the present invention utilizes a special elastomeric sleeve which is dimensioned to provide an interference fit between the tang of the control or drive spring and a control slot in the control collar of the associated clutch. Wrap spring clutches which have been modified according to this invention have been tested to over 20 million cycles of operation with no failures. This contrasts markedly with prior art wrap spring clutches which last under similar circumstances for about one million cycles of operation.

In one aspect, a preferred embodiment of a wrap spring clutch made according to this invention includes the following combination: a control collar having at least one control slot therein to receive a tang of a control spring; a control spring having a tang on one end thereof to be inserted in the control slot of the control collar; and an elastomeric sleeve which is positioned on the tang and is also dimensioned relative to the tang and control slot in the control collar to remove any looseness or play between the tang and the control slot when the tang with the elastomeric sleeve thereon is inserted in the control slot of the control collar.

In another aspect, a preferred method of this invention relates to extending the life of a control spring in a wrap spring clutch whose control collar has at least one control slot therein to receive a tang of the control spring. The method includes the steps of: (a) selecting an elastomeric sleeve which is dimensioned to remove any looseness of play between the tang and the control slot when the tang with the elastomeric sleeve thereon is inserted in the control slot of the control collar; and (b) positioning the elastomeric sleeve on the tang and inserting the tang with the elastomeric sleeve thereon in the control slot of the control collar.

An advantage of the invention is that it profoundly increases the life of a wrap spring clutch compared to prior art clutches.

Other advantages are that it is inexpensive to add to existing clutches, and that the designs of existing clutches do not have to be altered to add this invention.

These advantages and others will become more apparent in connection with the following descriptions claims and drawing.

BRIEF DESCRIPTION OF THE DRAWING

FIG. 3 is a view similar to FIG. 2, with the view being used to show the relationship of the control collar and the drive and brake springs in the associated clutch;

FIG. 5 is an exploded view showing the drive spring tang, an elastomeric sleeve, and a control collar of a clutch made according to this invention.

DETAILED DESCRIPTION OF THE INVENTION

Figure 1:
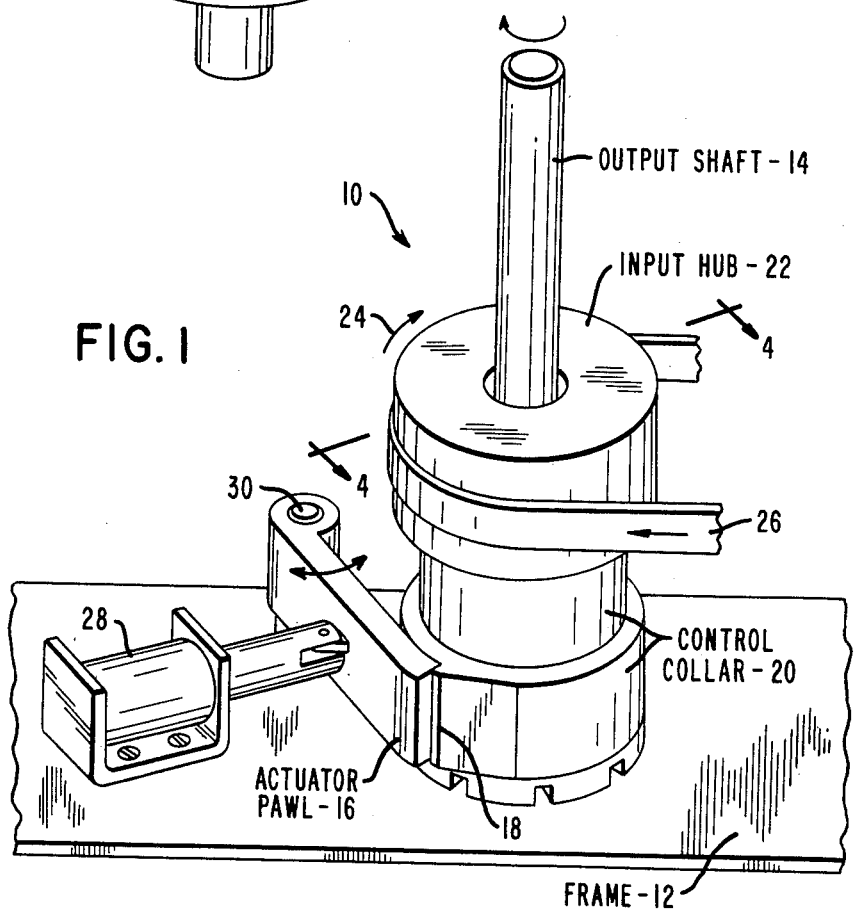
FIG. 1 is a diagrammatic view, in perspective, of a wrap spring clutch in which this invention may be used.

FIG. 1 shows a general perspective view of a wrap spring clutch 10 in which this invention may be used. The clutch 10 is mounted on a frame 12, and the particular type of clutch selected to portray the use of this invention is an incremental rotation type. For the embodiment shown, the output shaft 14 rotates for a complete revolution when the clutch 10 is actuated.

The overall operation of the clutch 10 is as follows. The clutch 10 is held in a deactivated position by an actuator pawl 16 which abuts against an abutment stop 18 projecting from a control collar 20 associated with the clutch 10. An input hub 22 is rotated (in the direction of arrow 24) at a constant velocity by an endless belt 26 and motor (not shown), and it provides the constant rotary input to the clutch 10. When the clutch 10 is to be actuated, the solenoid 28 is energized causing the actuator pawl 16, which is pivotally mounted on a pin 30, to move away from the abutment stop 18, permitting the control collar 20 to rotate in the direction of arrow 24. When the control collar 20 moves as indicated, the rotary motion of the input hub 22 is transferred to the output shaft 14 by a control or drive spring as will be described hereinafter. In a single revolution clutch design, the solenoid 28, when de-energized, pivots the actuator pawl 16 (via a conventional spring not shown) to a position where it abuts against the approaching abutment stop 18 on the control collar 20 to deactivate the clutch 10. When the control collar 20 is stopped from rotating, the drive spring referred to is "unwound" to uncouple the output shaft 14 from the constantly rotating input hub 22, as will be described herein-after. The constant starting and stopping of a prior art clutch at high speeds of operation causes it to fail, as described earlier herein.

Figure 2:
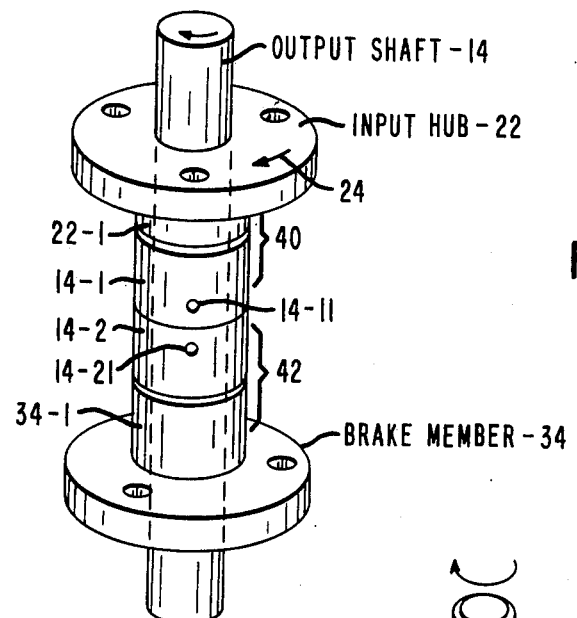
FIG. 2 shows, in an enlarged perspective and diagrammatic view, certain portions of a prior art clutch.

Wrap spring clutches are sometimes difficult to explain, and as a result, it appears easier to describe them in relation to diagrammatic showings instead of actual mechanical drawings. In this regard, FIGS. 2 and 3 show a prior art wrap spring clutch with enough of the structure of the clutch shown to permit the present invention to be oriented with respect to the clutch. Complete details of wrap spring clutches may be found, for example, in a brochure entitled, "Warner Wrap Spring Clutches and Brakes" which was published in 1982 by Warner Electric Brake & Clutch Company. The prior art elements shown in FIGS. 2 and 3 are given the same reference numbers as corresponding elements in the clutch 10 (FIG. 1) so as facilitate an understanding of clutch 10 in which this invention was incorporated.

FIGS. 2 and 3 diagrammatically show some of the construction details of a wrap spring clutch which facilitate an understanding of its operation. The input hub 22 which is driven by the belt 26 (FIG. 1) is rotatably mounted on the output shaft 14. The output shaft 14 has a first diameter portion 14-1 whose diameter is equal to the diameter of the sleeve 22-1 which is part of the input hub 22. The output shaft 14 also has a second diameter portion 14-2 whose diameter is equal to the diameter of the sleeve 34-1 of a brake member 34 which is secured to the base plate or frame 12. From the construction described, the output shaft 14 is free to rotate in the brake member 34, and the input hub 22 rotates on the output shaft 14.

To provide the coupling and braking when the clutch 10 is actuated and de-actuated, respectively, a control or drive spring 36 and a control or brake spring 38 (FIG. 3) are provided. The drive spring 36 is made of square steel spring material and has an inner end 36-1 which is radially aligned (relative to the body of the spring 36) and which fits into the round hole 14-11 (FIG. 2) of the first portion 14-1 of the output shaft 14 when mounted thereon. The drive spring 36 (FIG. 3) also has an outer end or tang 36-2 which is radially aligned, relative to the body of the spring and sleeve 22-1, and which is inserted in one of the radially-aligned slots like 20-1 appearing in the control collar 20. Correspondingly, the brake spring 38 has an inner end 38-1 which is fitted into the round hole 14-21 located in the second portion 14-2 of the shaft 14, and the brake spring has an outer end or tang 38-2 which is inserted into one of the radially-aligned slots, like 20-2, appearing in the control collar 20. The drive spring 36 and the brake spring 38 are wound in opposite directions so that as the drive spring 36 "tightens down" to form a driving connection, the brake spring 38 "loosens up" to uncouple the output shaft 14 from the brake member 34. The drive spring 36 encircles the sleeve 22-1 of the input hub 22 and the first portion 14-1 of the output shaft 14, as shown by bracket 40 in FIG. 2. Correspondingly, the brake spring 38 encircles the second portion 14-2 of the output shaft 14 and the sleeve 34-1 of the brake member 34, as shown by bracket 42 in FIG. 2.

The operation of the clutch shown in FIGS. 2 and 3 is as follows. When the control collar 20 is released to actuate the clutch (by a pawl similar to pawl 16 releasing abutment 18), the control collar 20 begins to rotate in a clockwise direction (as viewed in FIG. 3). The tang 36-2 is positioned in one of the slots 20-1 (FIG. 3) to bias the control collar 20 to rotate in the clockwise direction mentioned when the control collar 20 is released. As soon as the control collar 20 begins to rotate in the clockwise direction (relative to the stationary output shaft 14), the brake spring 38 "unwinds" so as to free the output shaft 14 from the braked position with regard to the brake member 34. Also, as the control member 20 rotates in the clockwise direction (relative to the stationary output shaft 14), the drive spring "tightens down" on the sleeve 22-1 of the input hub 22 and the first diameter portion 14-1 of the output shaft to thereby transfer the rotary motion of the input hub 22 to the output shaft 14. The control member 20 is also carried around in the clockwise direction by the drive spring tang 36-2.

When the clutch shown in FIG. 3 is to be deactuated, a pawl like 16 in FIG. 1 is moved into abutting relationship with the stop 18, stopping the rotation of the control collar 20. When the control collar 20 is stopped, the inertia left in the output shaft 14 causes the drive spring 36 to "loosen up" while the brake spring 38 (which is wound in the opposite direction) "tightens down" on the sleeve 34-1 of the brake member 34 and the second diameter portion 14-2 to stop the rotation of the output shaft 14. When the drive spring 36 loosens up, it uncouples the output shaft 14 from the input hub 22, enabling the input hub 22 to rotate while the output shaft 14 remains in the braked or stationary position by the brake spring 38. While a clutch like that shown in FIGS. 2 and 3 may include additional elements, like an anti-back up spring, for example, such additional elements are not necessary to an understanding of this invention, and consequently, they are not shown nor will they be described.

With the clutch arrangement found in FIGS. 2 and 3, the type of clutch shown therein failed after about one million cycles of repeated operation when the clutch was operated at the high end of its operating speed. The drive spring 36 of the clutch failed at the bend which forms the tang 36-2 of the drive spring 36. As stated earlier herein, the numerous attempts by clutch vendors and others to change the wire size of the drive, spring, the wire material, and the wire geometry, for example, failed to provide a solution which prolonged or extended the life of the drive spring 36 and the associated clutch.

Figure 4:
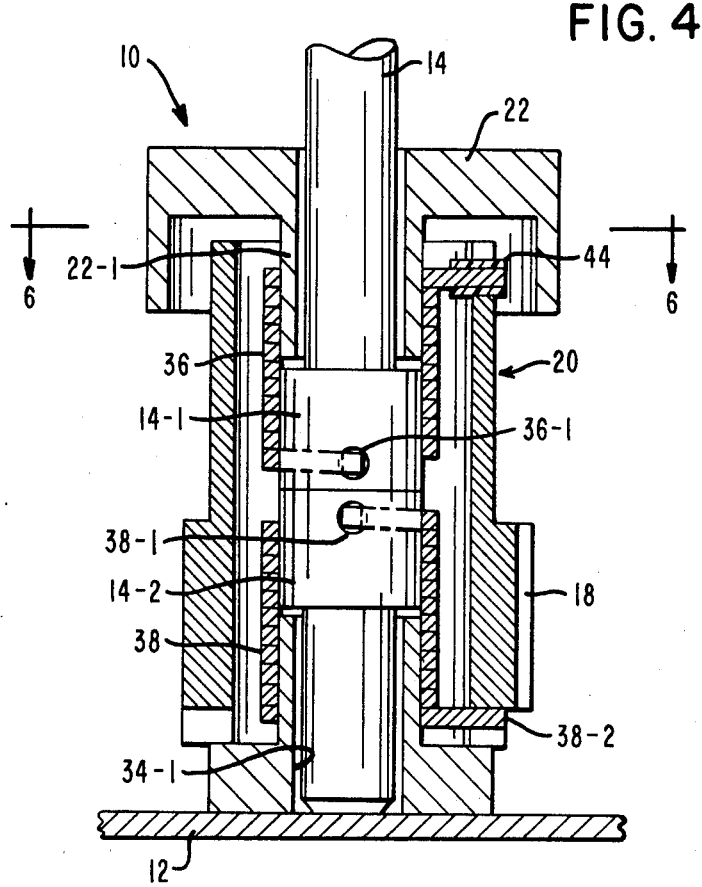
FIG. 4 is a cross sectional view, taken along the line 4—4 of FIG. 1, to show additional details of the clutch made according to this invention.
Figure 6:
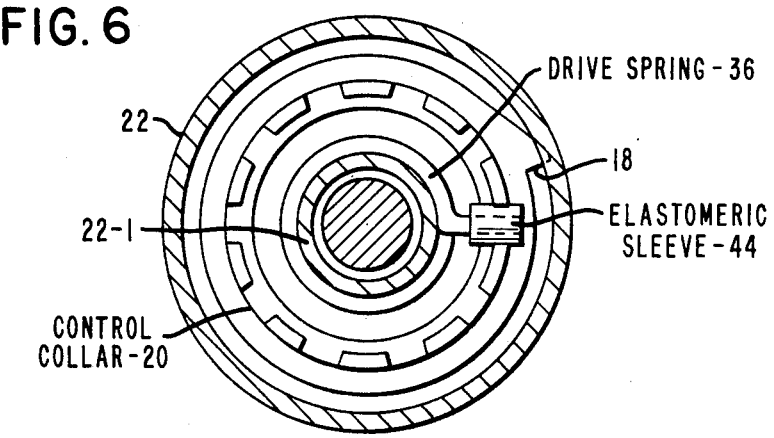
FIG. 6 is a view taken along the lines 6—6 of FIG. 4 to show how the drive spring tang with the elastomeric sleeve thereon is fitted into a control slot of the control collar.

The clutch 10, showing the present invention, is shown in FIGS. 4, 5 and 6 in addition to FIG. 1. The basic operation of the clutch 10 is similar to that described in relation to FIGS. 1 and 3, for example. The present invention includes an elastomeric sleeve 44 which is dimensioned to provide an interference fit between the tang 36-2 of the drive spring 36 and one of the control slots 20-1 appearing in the control collar 20. In the embodiment described, the elastomeric sleeve 44 has the shape of cylindrical tubing and has a length which is sufficient to extend through the wall of the control collar 20 as shown in FIG. 6, for example. It is conceivable that the elastomeric sleeve 44 could have the same cross sectional shape as the tang 36-2 of the drive spring 36; however, providing the tang 36-2 and the elastomeric sleeve 44 with different cross sections as described and as shown in FIG. 5 appears to augment the interference fit.

To provide the interference fit between the tang 36-2 of the drive spring 36 and one of the control slots 20-1, the following procedures are used. Naturally, the particular dimensions used depend, initially, upon the dimensions of the tang 36-2 and the control slots 20-1 which are rectangular or U-shaped in cross section. For example, with the tang 36-2 having a square cross section with a side dimension of the square being 0.031 (±0.005) inch, the internal diameter of the sleeve 44 would be dimensioned as 0.034 (±0.005) inch to provide the interference fit between the tang 36-2 and the internal diameter of the sleeve 44. A square 0.031 inch on a side does form an interference fit with a sleeve 44 having an internal diameter of 0.034 inch at the corners of the square. Continuing with the example being described, the slots 20-1 in the control member 20 are radially aligned, with the narrowest dimension of a slot 20-1 (adjacent the inner wall of the control member) being about 0.060 ±0.005 inch. For such an example, the sleeve 44 has a wall thickness of 0.030 ±0.005 inch thickness to provide the interference fit between the outer diameter of the sleeve 44 and the narrowest width of the control slot 20-1.

After testing a variety of materials for the elastomeric sleeve 44, it was discovered that a sleeve 44 made of polyurethane material having a hardness of at about 95 durometer Shore A seemed to work best, although a range of hardness from about 95 durometer Shore A to about 60 durometer Shore D appeared to work well. Teflon (a registered trademark of Du Pont) and Tygon (a registered trademark of Norton Company of Ohio) were tried; however, these materials appeared too brittle and did not last as long as a sleeve 44 made of polyurethane material. A sleeve 44 made of polyurethane material softer than 95 durometer Shore A did not work well either. It appears as though a sleeve made of polyurethane having a hardness of at least 95 durometer Shore A is soft enough to be deformed, partially, to produce the interference fit mentioned, and yet it is hard enough to provide a lasting cushion between the tang 36-2 and a slot 20-1 in the control collar 20.

It is not thoroughly understood why the use of the sleeve 44 in the clutch 10 extends the life of the clutch 10 from about one million cycles of operation to a life of over 20 million cycles. It appears as though the tang 36-2 was subjected to shock loads in the prior art arrangement shown in FIG. 3 which appeared to cause early failure of the drive spring 36 and the associated clutch.

While this invention is described in terms of the tang 36-2 of the control or drive spring 36, it may also be extended to the tang 38-2 of the control or brake spring 38 (FIG. 3) if breaking of the tang 38-2 becomes a problem.

The method according to this invention of extending the life of a drive spring 36 in a wrap spring clutch 10 whose control collar 20 has at least one control slot 20-1 therein to receive a tang 36-2 of the drive spring is as follows: (a) selecting an elastomeric sleeve 44 which is dimensioned to remove any looseness or play between the tang 36-2 and control slot 20-1 when said tang 36-2 with said elastomeric sleeve 44 thereon are inserted in the control slot 20-1 of the control collar; and (b) positioning the elastomeric sleeve 44 on the tang 36-2 and inserting the tang 36-2 with the elastomeric sleeve 44 thereon in the control slot 20-1 of the control collar 20.

What is claimed is:

1. In a wrap spring clutch, the combination comprising:
   a control collar having at least one control slot therein to receive a tang of a control spring;
   a control spring having a tang on one end thereof to be inserted in said control slot of said control collar; and
   an elastomeric sleeve which is positioned on said tang and is also dimensioned relative to said tang and control slot in said control collar to remove any looseness or play between said tang and said control slot when said tang with said elastomeric sleeve thereon is inserted in said control slot of said control collar.

2. The combination as claimed in claim 1 in which said elastomeric sleeve is dimensioned to provide an interference fit between said tang and said control slot.

3. The combination as claimed in claim 2 in which said elastomeric sleeve is made of polyurethane material.

4. The combination as claimed in claim 3 in which said polyurethane material is in the shape of cylindrical tubing, said tang is generally square in cross section, and said control slot is generally "U-shaped" in cross section.

5. The combination as claimed in claim 4 in which said polyurethane material has a hardness of about 95 durometer Shore A.

6. The combination as claimed in claim 3 in which said tang and said elastomeric sleeve have different cross sections to augment said interference fit.

7. In a wrap spring clutch, the combination comprising:
   a frame;
   an output shaft rotatably mounted in said frame and also having a first portion;
   an input member having a cylindrical sleeve portion rotatably mounted on said output shaft;
   said cylindrical sleeve portion having an outer diameter which is substantially equal to the diameter of said first portion of said output shaft;
   a control collar rotatably mounted in said frame; said control collar having at least one control slot therein to receive a tang of a drive spring;
   a cylindrical drive spring having a longitudinal length to surround at least partially said first portion of said output shaft and said sleeve portion of said input member;
   said cylindrical drive spring having one end secured to said first portion of said output shaft and also having a tang located at the remaining end;
   an elastomeric sleeve which is positioned on said tang and dimensioned relative to said tang and control slot in said control collar to remove any play between said tang and said control collar; and
   actuating means for releasing said control collar permitting said cylindrical drive spring to connect said input member to said output shaft to rotate said output shaft as said input member is rotated.

8. The combination as claimed in claim 7 in which said elastomeric sleeve is dimensioned to provide an interference fit between said tang and control slot.

9. The combination as claimed in claim 8 in which said elastomeric sleeve is made of polyurethane material.

10. The combination as claimed in claim 9 in which said polyurethane material is in the shape of cylindrical tubing.

11. The combination as claimed in claim 10 in which said polyurethane material has a hardness of about 95 durometer Shore A to about 60 durometer Shore D.

12. The method of extending the life of a control spring in a wrap spring clutch whose control collar has at least one control slot therein to receive a tang of said control spring, said method comprising the steps of:
  (a) selecting an elastomeric sleeve which is dimensioned to remove any looseness or play between said tang and said control slot when said tang with said elastomeric sleeve thereon is inserted in said control slot of said control collar; and
  (b) positioning said elastomeric sleeve on said tang and inserting said tang with said elastomeric sleeve thereon in said control slot of said control collar.

13. The method as claimed in claim 12 in which said selecting step is effected by dimensioning said elastomeric sleeve to provide an interference fit between said tang and said control slot.

14. The method as claimed in claim 13 in which said selecting step is effected by choosing a polyurethane material having a hardness of about 95 durometer Shore A.

15. The method as claimed in claim 14 in which said dimensioning step is effected by providing said elastomeric sleeve with a cylindrical tubular cross section when said tang has a square cross section.

16. An elastomeric sleeve for use in a wrap spring clutch having a control spring having a tang which fits into a control slot of a control collar associated with the wrap spring clutch,
  said elastomeric sleeve being made of polyurethane material and being dimensioned to provide an interference fit between said tang and said control slot.

17. The elastomeric sleeve as claimed in claim 16 in which said tang and said elastomeric sleeve have different cross sections to augment said interference fit.

18. The elastomeric sleeve as claimed in claim 17 in which said polyurethane material has a hardness of about 95 durometer Shore A.

19. The elastomeric sleeve as claimed in claim 17 in which said elastomeric sleeve is tubular in cross section and said tang is square in cross section and in which said polyurethane material has a hardness of about 95 durometer Shore A to about 60 durometer Shore D.

* * * * *